United States Patent [19]
Dousset

[11] 3,872,799
[45] Mar. 25, 1975

[54] SHOCK ABSORBING APPARATUS
[75] Inventor: Remy Dousset, Lyon, France
[73] Assignee: Societe Nouvelle des Ateliers de Venissieux, Paris, France
[22] Filed: Mar. 29, 1973
[21] Appl. No.: 346,039

[30] Foreign Application Priority Data
Oct. 20, 1972 France .............................. 72.37299
Jan. 16, 1973 France .............................. 73.01410
May 10, 1972 France .............................. 72.16701

[52] U.S. Cl. ................ 105/492, 5/353, 214/10.5 D
[51] Int. Cl. ............................................ B61d 45/00
[58] Field of Search ......... 105/369 BA, 376, 369 D, 105/392.5; 214/10.5 D; 248/119 R; 5/351, 353; 267/142–146, 80, 82, 91, 103, 110; 206/46 FR

[56] References Cited
UNITED STATES PATENTS
| | | | |
|---|---|---|---|
| 2,907,580 | 10/1959 | Tietig | 214/10.5 D |
| 3,131,648 | 5/1964 | Seger | 214/10.5 D X |
| 3,145,853 | 8/1954 | Langenberg | 105/369 BA |
| 3,263,247 | 8/1966 | Knittel et al. | 5/353 |
| 3,427,995 | 2/1969 | Stafford | 105/369 BA |
| 3,667,625 | 6/1972 | Lucas | 105/369 BA X |

Primary Examiner—Lloyd L. King
Assistant Examiner—Gene A. Church
Attorney, Agent, or Firm—Cameron, Kerkam, Sutton, Stowell & Stowell

[57] ABSTRACT

A shock-absorption apparatus for insertion between loads, which may or may not be on pallets, conveyed in vehicles, or between the loads and the walls of the vehicle.

21 Claims, 9 Drawing Figures

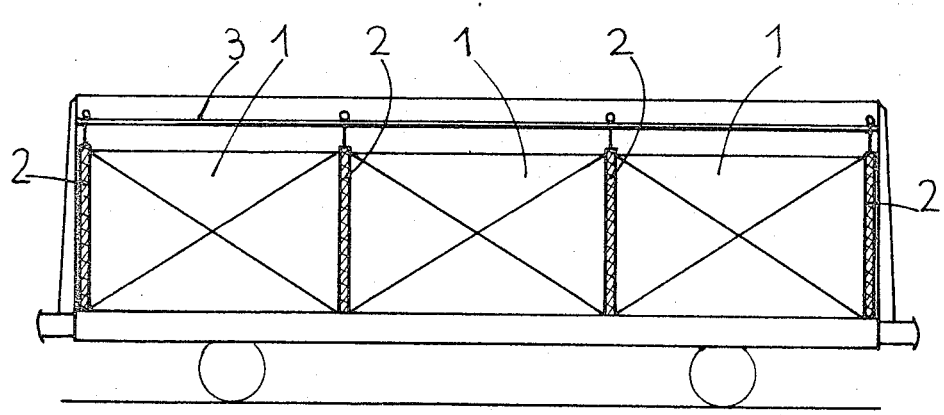
FIG:1
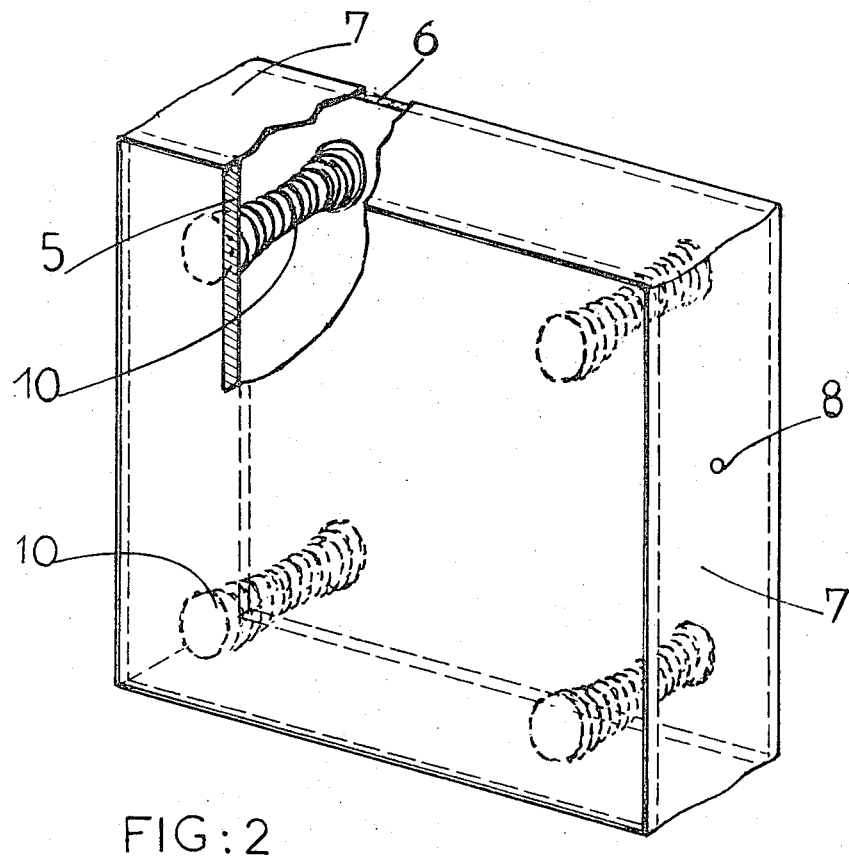
FIG:2

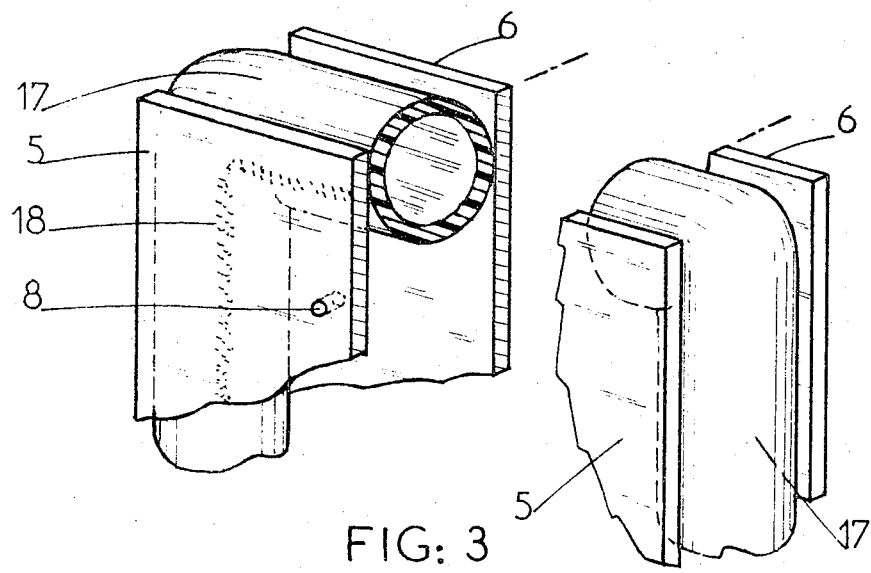
FIG: 3
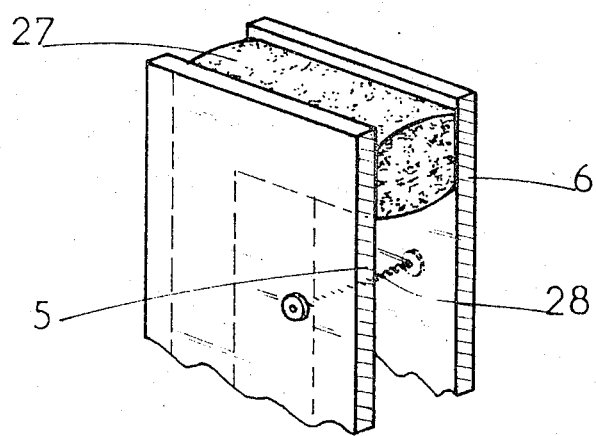
FIG: 4

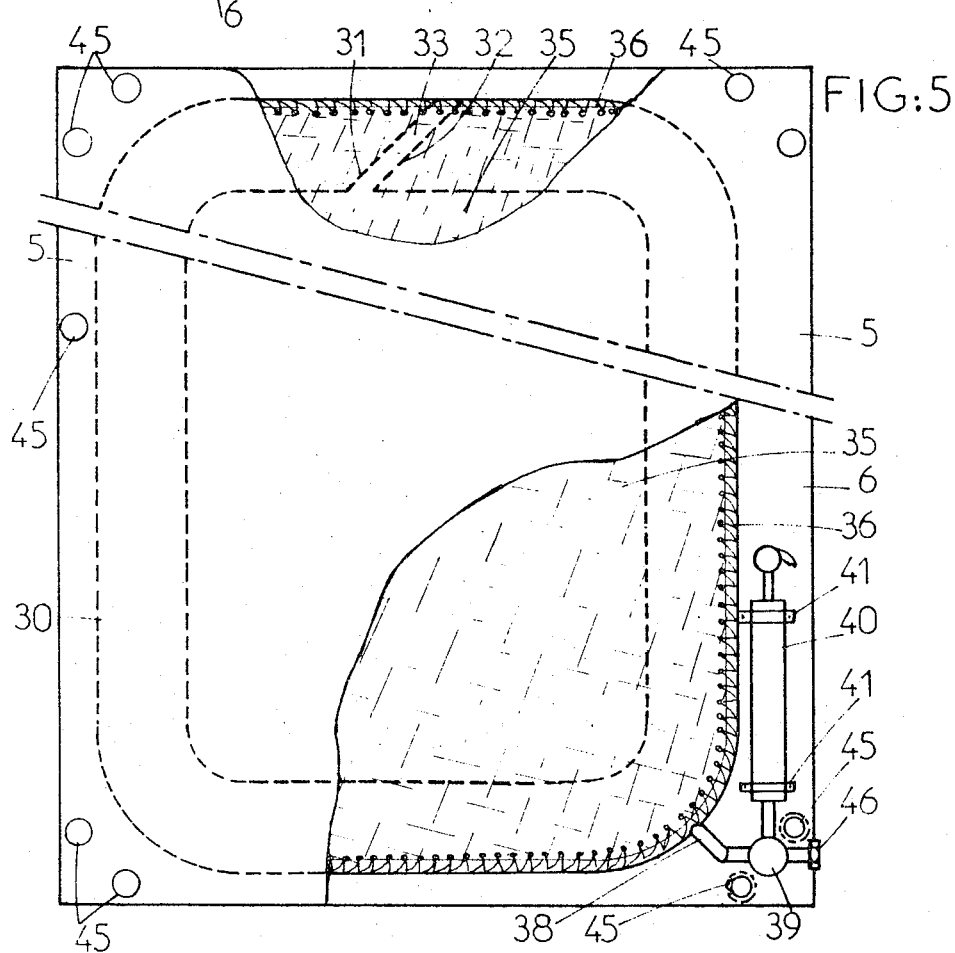

SHOCK ABSORBING APPARATUS

The present invention relates to a shock-absorption apparatus for insertion between loads, which may or may not be on pallets, conveyed in vehicles, or between the loads and the walls of the vehicle. It is more particularly applicable to trucks, lorries or road trailers and generally to any vehicle which can be subject to considerable acceleration or deceleration.

The loads, which may or may not be on pallets, conveyed in vehicles are subjected during transport to considerable shocks or decelerations, which can deteriorate the goods conveyed and cause sliding of these goods on the pallets; in the latter case, the packages can interlock and it becomes difficult to off-load the pallets.

To overcome these disadvantages, intercalary partitions have already been used, for example partitions suspended from longitudinal rails fixed in the upper portion of the truck. This permits division of the whole of the truck load by intercalation of these various intermediate partitions. Moreover, mechanical, hydraulic or, more often, pneumatic shock absorption apparatus are associated with these intercalary partitions. These pneumatic shock absorption apparatus consist of inflatable cushions which are arranged either at the centre or at the two ends of the vehicle. These cushions are inflated after being placed in position. This inflation provides both wedging and protection against shocks for the goods.

However, such apparatus have numerous disadvantages. Their normal operation consists in effect of arranging them between loads, or between loads and partitions and then inflating them after loading, thus locking the whole load against the end walls or intercalary walls. At the moment of collision or sharp deceleration, the whole load, or only a portion of it, is projected against the wall, i.e. against the inflated cushion. This apparatus has the disadvantage of requiring the availability of a compressed air source with a relatively high delivery rate to be able to inflate the cushions at the loading point. Moreover, it is obvious that the least puncture in the wall of the cushion, or even a certain porosity, causes a leak which renders the system inoperative shortly after its location.

The present invention overcomes these disadvantages while permitting the same shock absorption quality as the known apparatus.

The invention relates to a shock-absorption apparatus to be inserted between loads conveyed in a vehicle, or between a load and a wall or a partition of the vehicle. In accordance with the invention, the shock absorption apparatus consists of at least one assembly composed of two rigid tight panels connected by a flexible, tight joint, the assembly enclosing a volume of air communicating with the atmosphere through a measured orifice of small cross-section, the two panels being held apart when in use by elastic elements applying a force which is simply sufficient to bring the panels into the maximum separation position when the shock-absorption apparatus is, in use, in the free state, in the absence of any external influence.

In accordance with a particular embodiment of the invention, the flexible, tight joint connecting the two plates is an elastic, annular device, approximately following the periphery of the two plates and constituting, by itself, the elastic element separating the plates.

In accordance with another particular embodiment of the invention, the elastic, annular device consists of a closed tube connected to a manual, low-pressure inflation apparatus, the two plates being, moreover, connected by elastic organs which tend to bring them together as much as possible when the tube is deflated.

In accordance with a novel modification, the tube is contained in a non-tight bag which encloses it about its external periphery.

The invention will now be described in more detail with reference to particular embodiments offered by way of example and illustrated by the attached drawings.

FIG. 1 specifies schematically the arrangement of the shock-absorption apparatus for the protection of loads in a truck.

FIG. 2 shows the construction of such an apparatus in accordance with a first embodiment of the invention.

FIG. 3 relates to a second embodiment and is a partial perspective view, with a portion cut away, of a shock-absorption apparatus using a flexible tube filled with a low-pressure air as the flexible, tight joint.

FIG. 4 shows a modification of FIG. 3, using a strip of elastic foam.

FIG. 5 is a frontal view of a panel in accordance with a third embodiment, with partial views in which the front panel is assumed to be removed.

FIG. 6 gives, in its left-hand portion a section along the line A of FIG. 5 and in its right-hand portion an external end view of the panel.

FIG. 7 shows a further modification in the same manner as FIG. 5.

Figure 8:
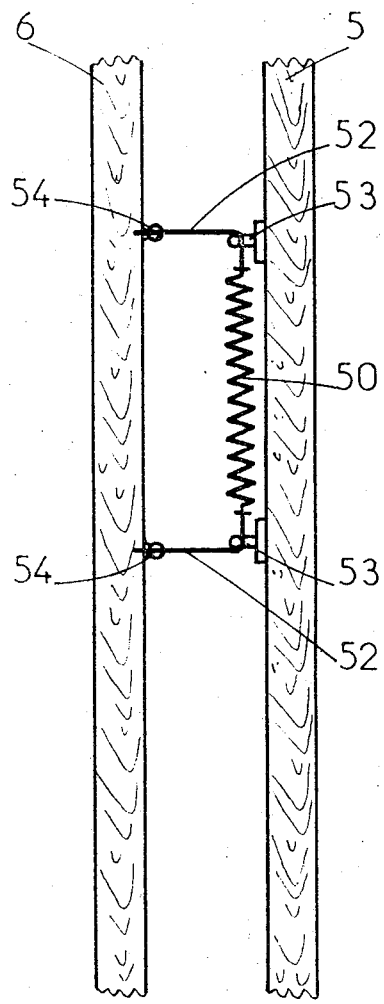
Figure 9:
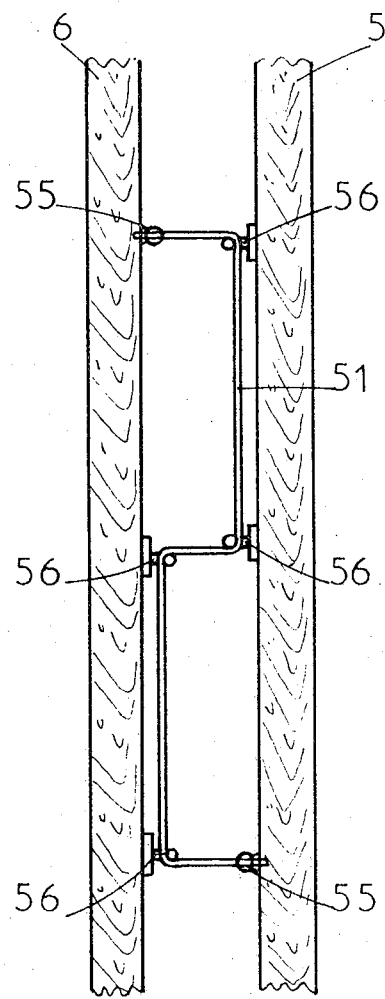

FIGS. 8 and 9 show two modifications of elastic organs tending to bring together the two rigid panels.

In accordance with FIG. 1, the truck load is here divided into three portions 1 and the shock-absorption panels 2 are arranged at the ends of the truck, between the load and the frontal walls, and also between the loads. Each apparatus 2 is of sufficient height to act over the whole useable height of the truck, but it only occupies, in general, half the width of the truck. Shock-absorption apparatus 2 are here shown adjustably suspended from a longitudinal runner 3, but this is only an appended arrangement and panels 2 can just as well be completely independent.

With reference to FIG. 2, each shock-absorption panel consists of two rectangular, parallel sheets 5 and 6, and these two plates are connected by a flexible, tight joint 7. This flexible joint may be, for example, of proofed fabric, plastics film, or leather. The connection of joint 7 to panels 5 and 6 is air-tight and is formed, for example, by gluing or nailing with interposition of a seal. Seal 7 is pierced by a lateral, measured orifice 8. The two plates 5 and 6 are also connected inside joint 7 by four springs 10.

It will be seen that in the rest position springs 10 keep the two plates 5 and 6 apart and the assembly of the plates and joint 7 encaptures a certain volume of air. When such a panel has been arranged between two loads in the truck and a shock or large deceleration of the truck causes movement of a stack in the load, this movement compresses the shock-absorption panel, tending to bring together the two rigid sheets 5 and 6. This reduction of volume causes an increase in the air-pressure, which causes a very slight deformation of joint 7, but mainly the evacuation of the air so compressed through measured orifice 8. The air compressed between the two plates 5 and 6 can only be evacuated through orifice 3 at a very slow rate, so much so that the shock-absorption effect is maintained for a long period, very easily longer than that of a large deceleration caused, most often, by an impact. If, for example, a load of the order of from 1 to 1.5 metric tons is considered, applied to a shock-absorption panel with an area of 2.4 m² and subjected to a maximum residual deceleration of 4g (deduction resulting from friction on the floor of the vehicle) a momentary pressure inside the panel of $1{,}500 \times 4/24{,}000 = 0.25$ kg/cm² would be obtained. This sharp deceleration would produce a load displacement of approximately ¼ of the space between the two rigid sheets. The displacement is effected in a very short time, generally smaller than 1/10 of a second, and pressure equilibrium is then re-established naturally through the measured orifice. It will be seen that thus, by fractions of a quarter of the residual volume, the panel can absorb several successive shocks.

It will be noted that springs 10 play practically no part in the shock-absorption and they are calculated to introduce only a negligeable resistance to the crushing of the panel under the effect of a shock. The only resistance to shocks results from compression of the air between the panels and joint 7. The only purpose of the springs is to restore the spacing of the rigid sheets to its maximum possible value when the load is not pressed up against them and they thus contribute to the refilling of the apparatus with air, replacing that which was evacuated through orifice 8 at the moment of compression.

Again, it will be seen that the apparatus thus constructed in accordance with the invention can undergo a small, accidental tear without its efficiency being very substantially reduced. A puncture, or even a certain porosity of joint 7, increases the leakage rate, but in any case the duration of the shock always remains well below the duration necessary for the complete expulsion of the air contained in the shock-absorber, even through an orifice with a slightly larger cross-section.

Reference will now be made to FIGS. 3 and 4 for another simplified embodiment of the shock-absorption panel. Here, in accordance with FIG. 3, the two parallel plates 5 and 6 are connected by a rubber tube 17, closed on itself and glued to each of the plates along lines 18 which are diametrically opposed relative to the tube. Tube 17 forms a sealed capacity which is simple filled with air at atmospheric pressure or at a slightly higher pressure. As this flexible joint must not be punctured, the measured escape orifice 8 is necessarily formed in one of the rigid plates. It has been shown here in a corcner of plate 5 for the convenience of the drawing, but it is obvious that its position is not important, just as it can in face consist of several small holes, forming an equivalent embodiment.

It will be seen that, when a shock takes place, progressively as the air escapes through orifice 8, absorbing the shock, tube 17 is crushed, slightly increasing its internal pressure. If, after the shock, the packages have not remained in contact with the plate, the pressure in tube 17 will tend to restore a circular cross-section to the tube and the whole of the apparatus will re-adopt its original over-all thickness.

In the modification shown in FIG. 4, the tight joint 27 consists of a strip of elastic foam, made of latex or other elastic material. The strip is also closed upon itself and forms a ring approximately following the periphery of the two plates and enclosing a large volume of air. Here strip 27 is not glued to plates 5 and 6, but is held between the plates by friction, by means of a slight precompression of the strip, obtained by ties 28 connecting plates and 6, keeping them at a distance from each other slightly smaller than the natural thickness of strip 17. Ties 28 are small chains or small, flexible cables attached to each of panels 5 and 6. One of the attachements could also include, for example, a threaded portion with a nut for regulating the lengths of the ties and therefore the initial compression of strip 27.

It will be noted that, if an open-cell foam is used for strip 27, all the holes in this foam will possibly constitute the equivalent of a measured orifice for the evacuation of air. If, conversely, a closed-cell foam is used, it does not matter whether the measured orifice is formed through this foam or through one of the two plates as in FIG. 3.

The operation of the shock-absorption apparatus so formed is still the same, i.e., on compression under the influence of a shock, absorption is obtained by the controlled escape of the internal air through the measured orifice or orifices, or through the cells of the foam; when the assembly is then released from external influences, it is the elasticity of the foam which returns the two panels to their normal spacing, limited by ties 28.

Of course, the modifications described by the two FIGS. 3 and 4 can be combined without departing from the scope of the invention. Thus a non-glued tube could also be used, held between the panels by a slight precompression, or else a strip of foam glued to the two plates could be used.

The invention can be carried out in accordance with yet another modification, permitting in particular the reduction, when the panel is not in use, of its thickness to a minimum and, consequently, the facilitation of storage. This modification is shown in FIGS. 5 to 9.

With reference firstly to FIGS. 5 to 7, the two parallel plates 5 and 6 grip a rubber tube 30 closed at each of its ends 31 and 32.

Ends 31 and 32 are not contiguous, but leave between them a small space 33 for passage of air. The whole of tube 30, forming a slightly open ring, is enclosed in a bag consisting of two pieces of fabric 35 connected by lacing 36.

Tube 30 is provided with a filler pipe 38 connected via a three-way tap 39 to a hand pump 40. Pump 40 is quite ordinary, of the bicycle pump type, and is attached to panel 6 by collars 41.

Panels 5 and 6 are finally connected by springs 45 arranged in the corners of the plates and substantially in the middle of the long sides. Springs 45 are short springs working under traction, i.e. they tend to bring together panels 5 and 6, to an over-all minimum thickness corresponding to complete flattening of tube 30 empty of air.

When not in use, for example for storage of the panels, tap 39 is turned so as to communicate pipe 38 with exhaust 46. Under the influence of springs 45 which lightly compress tube 30, the latter is completely emptied of air and the panel is brought to its minimum thickness. For use, tap 39 is turned to communicate pipe 38 with pump 40. Operation of pump 40 permits inflation of tube 30, which separates panels 5 and 6 from each other against the action of springs 45 which are very weak springs. The piston rod of pump 40 could be so adjusted that the required pressure in tube 30 would balance this rod, which forms a particularly simple manometer. When the required pressure has been reached in tube 30, tap 39 is turned to its position corresponding to the isolation of tube 30.

The assembly with the tube inflated then behaves like the apparatus shown in FIG. 3. On compression of the panel under the influence of a shock, flattening of tube 30 and a reduction in the volume of the chamber formed between panels 5 and 6 inside the loop of tube 30 will be observed. This reduction of volume will cause compression of the air in this chamber which will tend to escape from it through space 33 and through lacing 36 thus causing the shock-absorption effect. It will be observed that bag 35 prevents radial displacement of tube 30, while springs 45 still maintain a slight grip on the tube, which is thus constantly held in place.

It will also be noted that, if tube 30 is very slightly porous, the loss of air during one period of use can easily be compensated at the beginning of the next period of use by means of pump 40 and the apparatus will maintain its efficiency for a long period, simply on condition of a very simple manual inflation operation.

Of course, tube 30 could also be a tube closed upon itself, the measured orifice for communication of the chamber inside the panel with the outside then being, as shown in FIGS. 2, 3 and 4, arranged in the panels themselves. Obviously, in that case, a material will be selected to make bag 35 which allows easy passage of air, and this bag could then be a simple net.

It could again be conceived, as shown in FIG. 7, that tube 30 should close on itself, starting a spiral, and the necessary passage for evacuation of the air from the central chamber would then be gap 48 between the two sections of the tube.

Again, springs 45 of FIGS. 5, 6 and 7, perpendicular to the rigid surfaces, could be replaced by springs 50 or elastic rubbers 51 arranged in parallel to the surfaces and connected alternately to one wall and the other. FIGS. 8 and 9 show these two modifications respectively. In accordance with FIG. 8, spring 50, operating under traction, is extended by two flexible elements 52, which slide freely in rings 53 rigidly connected to panel 5, and which are attached at 54 to panel 6. In accordance with FIG. 9, rubber 51 is attached at its ends 55 to each of the 2 panels, and its median portion slides freely in rings 56 rigidly attached to the panels.

Of course, the invention is not rigidly limited to only the embodiments which have been described, but also covers embodiments which only differ from them by modifications or by the use of equivalent means. Thus, if it is required to obtain a more rapid return of the shock absorption apparatus to its normal state after a shock, a valve of large cross-section could be provided, closing when the apparatus is placed under compression, but opening widely to permit a high filling flow rate when the panels separate again under the action of the interior springs. Similarly, the metal return springs of FIG. 2 could be replaced by elastomer blocks, or even by small pneumatic capacities playing the same role.

Again, without departing from the scope of the invention, calibrated valve could be provided permitting a larger evacuation of compressed air to avoid deterioration of the shock absorber in the case of an exceptionally violent shock which would lead to an excessively high internal pressure.

A shock-absorption apparatus could be conceived consisting of a juxtaposition of two or more of the apparatus described, fastened to each other side by side.

I claim:

1. Shock-absorption apparatus for insertion between loads conveyed in a vehicle, or between a load and a wall or a partition of the vehicle, characterized by the fact that it consists of at least one assembly consisting of two rigid, tight panels, connected by a flexible, tight joint, the whole enclosing a volume of air communicating with the atmosphere through a measured orifice of small cross-section impeding the flow of air from the apparatus, the two panels when in use being held apart from each other by elastic elements having negligible shock absorption applying a force simply sufficient to bring the panels into the maximum separation position when the shock-absorption apparatus is in use in the free state, in the absence of any external influence.

2. Shock-abosrption apparatus as described in claim 1, characterised by the fact that to the measured orifice is added a valve which allows passage of a large flow of air, in the direction for filling the volume and closes when the interior air tends to be expelled to the outside.

3. Shock-absorption apparatus as described in claim 1 characterised by the face that is also includes a calibrated valve allowing a more rapid inward than outward passage of air when the internal pressure exceeds a predetermined value.

4. Shock-absorption apparatus as described in claim 1, characterised by the fact that the elastic elements are springs.

5. Shock-absorption apparatus as described in claim 1, characterised by the fact that the elastic elements are blocks of elastomer.

6. Shock-absorption apparatus as described in claim 1, characterised by the fact that the elastic elements are small, tight, elastic capacities filled with air.

7. Shock-absorption apparatus as described in claim 1, characterised by the fact that the tight, flexible joint connecting the two plates is an annular, elastic device approximately following the periphery of the two plates and constituting by itself the elastic element for separation of the plates.

8. Shock-absorption apparatus as described in claim 7, characterised by the faact that the annular, elastic device is glued to each of the two plates.

9. Shock-absorption apparatus as described in claim 7, characterised by the fact that the two panels are connected by ties allowing free relative motion of the panels towards each other and limiting their maximum separation to a value maintaining light initial compression of the elastic device.

10. Shock-absorption apparatus as described in claim 7, characterised by the fact that the annular elastic device is a closed tube filled with air at low pressure.

11. Shock-absorption apparatus as described in claim 7, characterised by the fact that the annular elastic device is a strip of elastic foam.

12. Shock-absorption apparatus as described in claim 11, in which the foam has closed cells, characterised by the fact that the measured orifice is formed in the foam.

13. Shock-absorption apparatus as described in claim 11, characterised by the fact that the foam has open cells, all the holes in this foam constituting the functional equivalent of the measured orifice communicating the volume of air entrapped between the panels with the atmosphere.

14. Shock-absorption apparatus as described in claim 7, characterised by the fact that the annular elastic device consists of a closed tube connected to a manual, low-pressure inflation apparatus, the two plates moreover being connected by elastic organs which tend to bring them together to the maximum when the tube is deflated.

15. Shock absorption apparatus as described in claim 14, characterised by the fact that the tube is closed on itself and that a measured orifice is formed in one of the plates.

16. Shock-absorption apparatus as described in claim 14, characterised by the fact that the tube is closed at its two ends, but these ends are not contiguous and form a slight gap between them constituting the measured orifice.

17. Shock-absorption apparatus as described in claim 14, characterised by the fact that the tube is enclosed in non-tight bag surrounding it about its external periphery.

18. Shock-absorption apparatus as described in claim 17, characterised by the fact that the non-tight bag is of a tight material and has an opening adjacent to the measured orifice.

19. Shock-absorption apparatus as described in claim 17, characterised by the face that the non-tight bag is a large mesh material allowing passage of air.

20. Shock-absorption apparatus as described in claim 16, and in which the tube is enclosed in a non-tight bag, characterised by the fact that the bag is of a tight material closed by peripheral lacing through wich the air can pass in the zone of the space between the non-contiguous ends of the tube.

21. Shock-absorption apparatus as described in claim 14, characterised by the fact that the manual inflation apparatus is attached to one of the panels and is connected to the tube by a three-way tap, enabling either the inside of the tube to be isolated or to be placed in communication with the inflation apparatus or with the atmosphere.

* * * * *